United States Patent [19]

Suzuki et al.

[11] 4,099,934
[45] Jul. 11, 1978

[54] METHOD FOR MANUFACTURING RESINOID-BONDED GRINDING TOOLS

[75] Inventors: Ikuo Suzuki, Chiryu; Tomoyasu Imai, Kariya; Masato Kitajima, Hekinan; Kazunori Hota, Okazaki, all of Japan

[73] Assignee: Toyoda Koki Kabushiki Kaisha, Aichi, Japan

[21] Appl. No.: 750,439

[22] Filed: Dec. 14, 1976

[30] Foreign Application Priority Data

Sep. 1, 1976 [JP] Japan ............................... 51-104395
Jul. 29, 1976 [JP] Japan ............................... 51-90611

[51] Int. Cl.$^2$ .......................... C23G 1/02; C23G 1/14
[52] U.S. Cl. .................................. 51/295; 51/298 A; 51/309 A; 51/307
[58] Field of Search .......................... 51/295, 298, 309

[56] References Cited

U.S. PATENT DOCUMENTS

| | | | |
|---|---|---|---|
| 2,379,544 | 7/1945 | Scutt | 51/298 |
| 2,536,183 | 1/1951 | Jamieson | 51/298 |
| 2,557,047 | 6/1951 | Goepfert et al. | 51/298 |
| 2,943,926 | 7/1960 | Goepfert | 51/298 |
| 3,664,819 | 5/1972 | Sioui et al. | 51/295 |
| 3,854,898 | 12/1974 | Whitney et al. | 51/309 |
| 3,868,232 | 2/1975 | Sioui | 51/295 |
| 3,923,476 | 12/1975 | Roy et al. | 51/295 |

FOREIGN PATENT DOCUMENTS 562,815  7/1944  United Kingdom ................... 51/298

*Primary Examiner*—Donald J. Arnold
*Attorney, Agent, or Firm*—Oblon, Fisher, Spivak, McClelland & Maier

[57] ABSTRACT

Resinoid-bonded grinding tools are prepared by applying a liquid thermosetting resin to the circumferential surface of a disc-like base member and then after coating metal-coated abrasive grains with a liquid thermosetting resin, mixing the coated grains with a powdered thermosetting resin. The mixture of the coated grains and the powdered thermosetting resin is press-formed upon the surface of the base member and then thermally set by heating.

11 Claims, 5 Drawing Figures

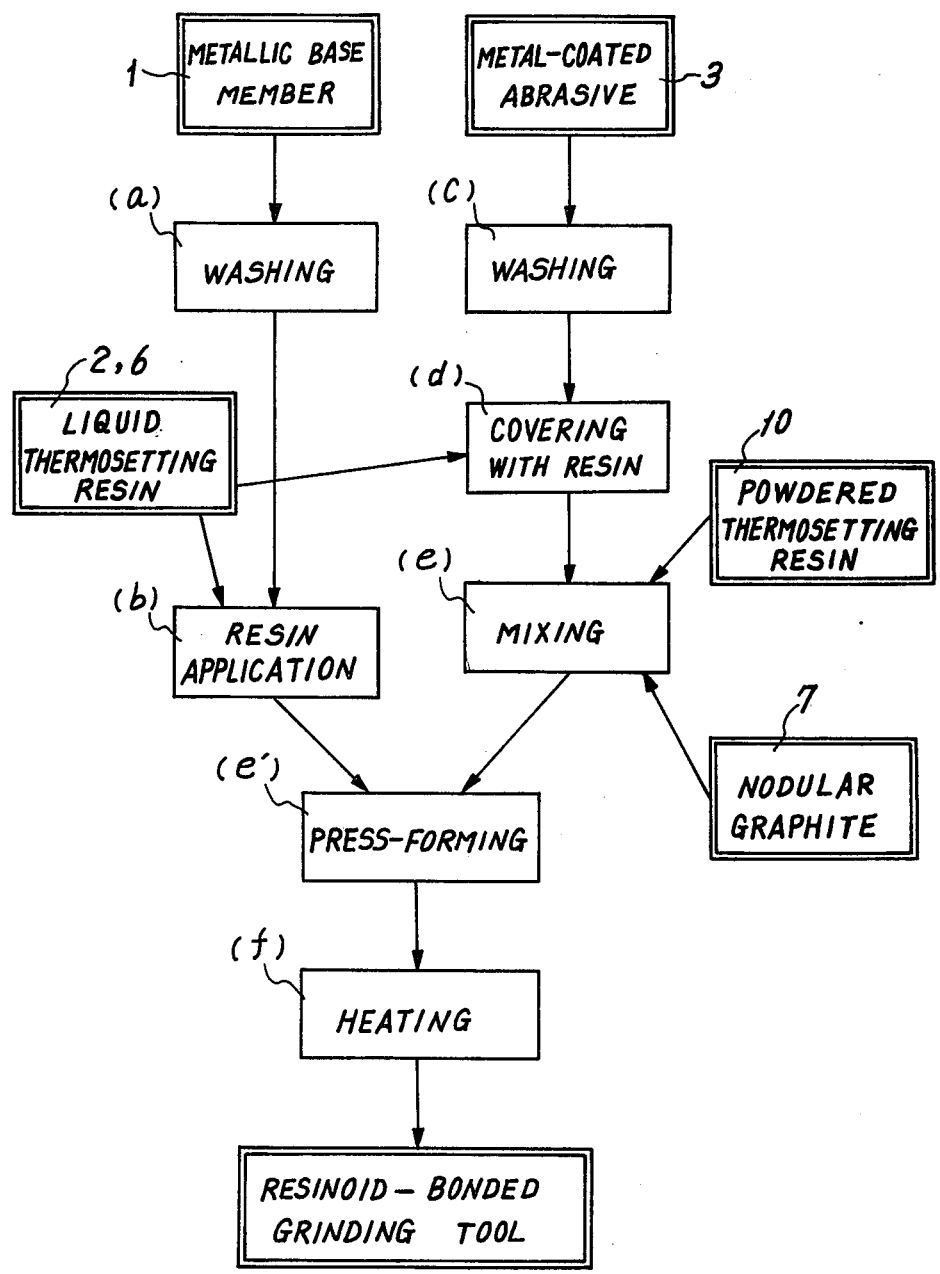

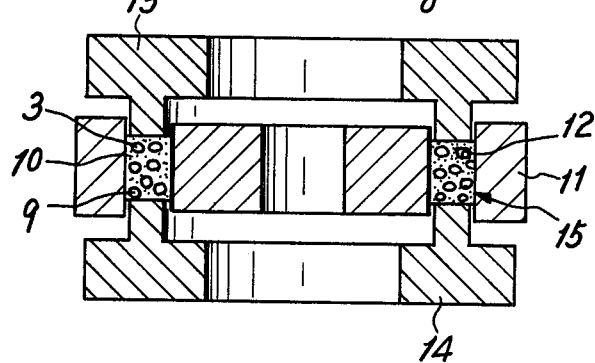
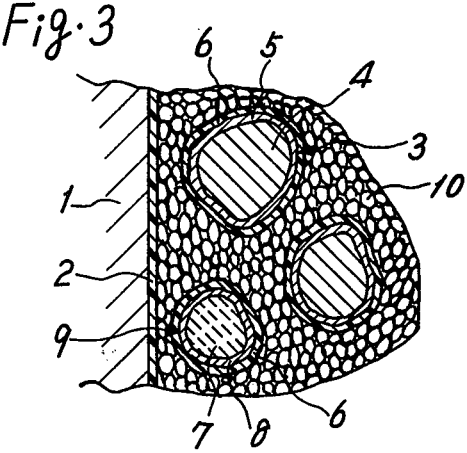
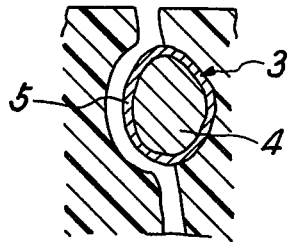
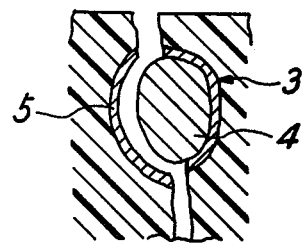

METHOD FOR MANUFACTURING RESINOID-BONDED GRINDING TOOLS

BACKGROUND OF THE INVENTION

1. Field of the Invention

The present invention relates generally to a method for manufacturing grinding tools. More particularly, the present invention relates to a manufacturing method for resinoid-bonded grinding tools in which a metal-coated abrasive grain is bonded on the surface of a base member with a thermosetting resin.

2. Description of the Prior Art

A method is known for the manufacture of resinoid-bonded grinding tools in which an abrasive grain is first mixed with a powdered thermosetting resin. The mixture is press-formed on a surface of a base member into a desired shape and is then set by heating. However, in this method, because an oxide film is created upon the base member during heating and because gas adheres to the surfaces of the abrasive grain and the base member during heating, the coupling or bonding of the thermosetting resin to the base member as well as to the abrasive grain is imperfect. Consequently, the mechanical strength of the grinding tool is weakened and adversely effected, particularly throughout the whole of its assembly.

SUMMARY OF THE INVENTION

Accordingly, one object of the present invention is to provide an improved method for manufacturing resinoid-bonded grinding tools of very good mechanical strength characteristics.

Another object of the invention is to provide an improved method for manufacturing resinoid-bonded grinding tools in which not only the abrasive grain, but also the base member are firmly bonded together with a thermosetting resin adhesive.

Briefly, these objects and other objects of the present invention as hereinafter will become more readily apparent can be attained by a method of manufacturing resinoid-bonded grinding tools in which a metallic base member and metal-coated abrasive grains are first washed, and then coated with a liquid thermosetting resin. The abrasive grain is then mixed with a powdered thermosetting resin. The mixture of the grain and the powdered resin is, thereafter, press-formed on the resin-applied surface of the base member and is, finally, thermally set by heating.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which like reference numerals designate like or corresponding parts through the several views, wherein:

FIG. 1 is a flow chart which sets forth the method of manufacturing of the present invention;

FIG. 2 is a schematic view which illustrates the device in which the mixture of abrasive grain, solid lubricant and powdered phenol resin are press-formed upon the surface of a metallic base member to a desired shape;

FIG. 3 shows an enlarged sectional view of the abrasive substance press-formed in FIG. 2;

FIG. 4 is an illustration which shows a crack which develops in a resinoid-bonded grinding tool manufactured by a prior method; and FIG. 5 is an illustration which shows a crack which develops in a resinoid-bonded grinding tool, manufactured by the method of the present invention.

DETAILED DESCRIPTION OF THE PREFERRED EMBODIMENTS

Referring to the drawings and particularly, to FIG. 1, a preferred embodiment of the present method of manufacturing a grinding tool is presented. By way of example, a grinding tool having an outside diameter of 500 mm, a width of 18 mm and a 3 mm thick abrasive stratum is manufactured by the following steps (a) to (f).

(a) In this step the circumferential surface of a disc-like base member 1 which, preferably, is made of aluminum-base alloy is washed. In this particular embodiment, the aluminum base member 1 which is machined to an outside diameter of 494 mm, a width of 23 mm and an inside diameter of 100 mm is prepared and washed as follows:

(i) The base member is first washed with a solvent to remove grease from the circumferential surface of the base member. Suitable grease removing solvents include dichloroethane, trichloroethylene, carbon tetrachloride, acetone, chloroform, hexane and benzene. With this treatment the grease which adheres to the base member in the machining operation can be eliminated. When the base member is steel or an aluminum based alloy, the base is normally washed with trichloroethylene for 5 to 10 minutes.

(ii) The base member is then washed with distilled water.

(iii) The base member is immersed for five minutes in 6 liters of a 3% aqueous solution of sodium hydroxide (NaOH) — alkali washing. When the base member is steel or an aluminum based alloy, the washing step is conducted with a caustic solution of 94% purity NaOH and distilled water at NaOH-water mixing ratios of 1:9 by weight and 1:19 volume percent respectively, for 2 to 5 minutes at room temperature.

(iv) After the alkali washing, the base member is washed with distilled water.

(v) The base member is immersed for five minutes in 6 liters of a 10% aqueous solution of nitric acid ($HNO_3$) — acid washing. When the base member is steel, the acid washing step is conducted with an aqueous solution of 36% purity HCl and distilled water at an HCl-water mixing ratio of 1:9 by volume for 2 to 5 minutes at room temperature. When the base member is an aluminum based alloy, the acid washing step is conducted with an aqueous solution of 61% purity $HNO_3$ for 2 to 5 minutes at room temperature.

(vi) Thereafter, the base member is washed with distilled water nd then dried by compressed air.

(b) The second step involves the application of a liquid phenol resin 2 to the circumferential surface of the base member. In this step, the liquid phenol resin 2 is brush-painted to a thickness of 10μ upon the circumferential surface of the base member 1 which was washed in step (a).

(c) The third step involves washing the metal-coated abrasive grain 3. For example, 185 g of a nickel-coated abrasive grain as a suitable metalcoated abrasive grain 3 can be prepared by a nickel chemical plating technique in which a nickel-phosphorus (Ni-P) alloy stratum 5 is coated upon particles of 80 mesh alundum (A) in an amount of 40 to 60 weight percent based on the same. The abrasive grain is washed as follows:

(i) The abrasive grain is boiled for ten minutes in 500 c.c. of an aqueous solution containing 5% NaOH and 3% ortho sodium silicate($Na_4SiO_4$) — alkali washing. The NaOH used in 94% pure while the purity of the sodium silicate is 90%. The basic solution is formed by mixing NaOH $Na_4SiO_4$ and water on a weight basis in a ratio of 5:3:92.

(ii) The grain is then washed with distilled water.

(iii) After washing with water, the grain was immersed for ten minutes in 500 c.c. of a 10% aqueous solution of nitric acid ($HNO_3$) at room temperature — acid washing. The $HNO_3$ used for the preparation of the wash solution has a purity of 61% and is prepared by mixing nitric acid and water in a volume ratio of 1:9.

(iv) Thereafter, the grains are washed with distilled water and then dried by compressed air.

The reason why metal-coated grains are employed in the present invention as abrasive grains is that it becomes possible to enhance the mechanical strength of grinding tools because metal-coated abrasive grains have a stronger affinity to phenol resins than non-metal-coated grains. Furthermore, suitable metal-coated abrasive grains include various abrasive materials such as alundum (A), white alundum (WA), carborundum (C), green carborundum (GC), cubic boron nitride (CBN), diamond (D) and the like upon which nickel, copper, cobalt or the like can be coated by a chemical nickel plating method, a chemical copper plating method, a chemical cobalt plating method or the like. Usually, the thickness of the metal coating on the grains ranges from 3 to 40$\mu$.

(d) The fourth step of the process involves coating the surface of the abrasive grain 3 with liquid phenol resin 6. In this step, 185 g of abrasive grains 3 which were washed in step (c), 30 g of solid lubricant 9 comprising 80 mesh particles 7 of nodular graphite (C) on which a nickel-phosphorus (Ni-P) alloy 8 or the like was coated as viewed in FIG. 3, and 15 g of liquid phenol resin 6 are placed in a vessel and are agitated so that the surfaces of the abrasive grain 3 and the metal-coated solid lubricant 9 are covered with liquid phenol resin 6. The thickness of the liquid thermosetting phenol resin layer on the surface of the base member is 0.005 to 0.3 mm. The solid lubricant 9 is added to the mixture to improve the metal removing ability of the resinoid-bonded grinding tool manufactured by the method of the present invention. However, the lubricant is not a critical component. Another suitable solid lubricant, is twin crystal boron nitride (BN). The mixing ratio of the metal coated grains and the powdered resin is 10 to 70:30 to 90 volume percent, while the mixing ratio of the grains, solid lubricant and the powdered resin is 10 to 70:1 to 45:15 to 90 volume percent.

(e) In the fifth step, the abrasive grain 3 which was covered with the liquid phenol resin 6, is mixed with the powdered phenol resin 10 and then is press-formed upon the surface of the base member 1 into a desired shape. The abrasive grain 3 and the solid lubricant 9, which were covered with liquid phenol resin 6 in step (d), and 45 g of powdered phenol resin 10 are placed in a vessel and are sufficiently mixed. Then, the base member 1 having the circumferential surface to which was applied liquid phenol resin 6 in step (b), is coaxially disposed in an outer die 11 having an inside diameter of 494 mm, as shown in FIG. 2. The base member 1 and the outer die 11, together with upper and lower dies 13, 14, define an annular vacancy 12, which is filled with the mixture of the abrasive grain 3, the solid lubricant 9 and powdered phenol resin 10. The upper and lower dies 13, 14 are moved toward each other to press-form the mixture under a pressure of 500 to 1000 kg/cm$^2$.

(f) In the last step the press-formed article 15 formed upon the circumferential surface of the base member 1 is thermally set by heating. The temperature of the thermosetting process usually ranges from 160° to 230° C. The upper limit should be less than 230° C because oxidation of the phenol resin starts at this temperature. After the upper and lower dies 13, 14 are disengaged from the die assembly, the base member 1 and the press-formed article 15 are integrally removed from the outer die 11 and are heated for about an hour in a furnace which is maintained at a temperature of about 180° C, and thereafter cooled. As a result of this treatment, the base member 1 and the phenol resin are firmly bonded together. Also, the abrasive grain 3 and the solid lubricant 9 and the phenol resin are firmly bonded together so that the abrasive grain 3 and the solid lubricant 9 can be securely stiffened upon the circumferential surface of the base member 1.

It is an important feature of the present invention that the surfaces of the metallic base member 1 and the metal-coated abrasive grains 3 are washed thereby removing surface oxides, impurities, etc. and exposing the pure metallic surfaces. The metal surfaces are then covered with liquid phenol resin, which consequently prevents the creation of an oxide film or the adherence of gas on the surfaces during heating. Because of this, the adhesivity between the abrasive grain 3, the phenol resin and the base member 1 is substantially strengthened.

The deflective strength of the abrasive stratum of the resinoid-bonded grinding tool manufactured as described above reaches 4.5 to 5.8 kg/mm$^2$ and is greater by about 1.5 kg/mm$^2$ than the deflective strength of the prior art bonded grinding tools. In addition, it has been confirmed by observation of the prior art grinding tools which have been destroyed, that the phenol resin separates from the abrasive grain 3 as shown in FIG. 4. On the other hand, in the tools manufactured by the present process the stratum 5 of the nickel-phosphorus (Ni-P) alloy which has been coated upon the abrasive grain 3 separates from the particles 4 of alundum as shown in FIG. 5.

Although in the procedure described above, a phenol resin has been used as a binding material, it is important to notice that the present invention is not to be limited to only phenol resins. Other suitable thermosetting resins include polyester resins, epoxide resins and the like. Moreover, the time sequence between a series of steps such as (a), (b), and another series of steps such as (c) to (e) in FIG. 1 is not critical.

As described above in detail, the present invention provides a method for manufacturing resinoid-bonded grinding tools, in which a metallic base member and metal-coated abrasive grains, after washing, are respectively painted and covered with a liquid thermosetting resin. Thereafter, the abrasive grain is mixed with a powdered thermosetting resin, and the mixture is press-formed upon the resin-applied surface of the base member and then thermally set by heating. The present invention, therefore, represents an advance in the art that the interaction between the thermosetting resin and the base member as well as the interaction between the thermosetting resin and the abrasive grain can be substantially strengthened. Consequently, the mechanical strength of the resinoid-bonded grinding tool as a whole is substantially improved.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method for manufacturing a resinoid-bonded grinding tool in which metal-coated abrasive grains are adhesively attached upon the surface of a metallic base member with a thermosetting resin, comprising the steps of:
  (a) washing said surface of said base member so as to expose a pure metallic surface thereon by washing said surface of said metallic base member with a grease removing solvent; washing said washed surface with an alkali solution; and then washing said alkali washed surface with an acid solution;
  (b) applying a liquid thermosetting resin to said pure metallic surface of said base member so as to prevent the formation of an oxide film thereon or the adherence of gas thereto during subsequent heating;
  (c) washing said abrasive grains;
  (d) coating the surface of said abrasive grains with a liquid thermosetting resin;
  (e) mixing a powdered thermosetting resin with said abrasive grains covered with said liquid thermosetting resin and press-forming the mixture upon said resin-applied surface of said base member to form a press-formed article of a desired shape; and
  (f) heating said press-formed article formed upon said base member so as to thermally set said formed article upon said base member.

2. The method of claim 1, wherein step (c) comprises washing said abrasive grains with an alkali solution; and then washing said washed grains with an acid solution.

3. The method of claim 1, wherein step (e) further comprises admixing a solid lubricant with said abrasive grains and said powdered thermosetting resin.

4. The method of claim 3, wherein said solid lubricant is a metal-coated nodular graphite.

5. The method of claim 4, wherein said metal-coated nodular graphite, as well as said abrasive grains, are covered with said liquid thermosetting resin in step (d).

6. The method of claim 5, wherein said thermosetting resin used in said steps (b), (d) and (e) is phenol resin.

7. The method of claim 5, wherein the metal coated on said abrasive grains and on said nodular graphite is a nickel-based alloy.

8. The method of claim 7, wherein said base member has a disc-like shape, and wherein said formed article is wheel-shaped and is formed by press-forming said mixture upon the outer circumferential surface of said base member.

9. The method of claim 8, wherein said base member is an aluminum-based alloy.

10. The method of claim 9, wherein step (a) comprises:
  washing said outer circumferential surface of said base member with a grease removing solvent;
  washing said washed surface with an alkali solution; and then,
  washing said alkali washed surface with an acid solution.

11. The method of claim 10, wherein step (c) further comprises:
  washing said nickel-coated abrasive grains with an alkali solution; and then,
  washing said washed grains with an acid solution.

* * * * *